United States Patent
Yoo et al.

(10) Patent No.: US 6,906,760 B2
(45) Date of Patent: Jun. 14, 2005

(54) ARRAY SUBSTRATE FOR A LIQUID CRYSTAL DISPLAY AND METHOD FOR FABRICATING THEREOF

(75) Inventors: Soon-Sung Yoo, Kyoungsangbuk-do (KR); Dong-Yeung Kwak, Taegu (KR); Hu-Sung Kim, Seoul (KR); Yu-Ho Jung, Kyoungsangbuk-do (KR); Yong-Wan Kim, Kyoungsangbuk-do (KR); Duk-Jin Park, Taegu (KR); Woo-Chae Lee, Kyoungsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 322 days.

(21) Appl. No.: 09/917,861
(22) Filed: Jul. 31, 2001

(65) Prior Publication Data

US 2002/0047948 A1 Apr. 25, 2002

(30) Foreign Application Priority Data

Aug. 2, 2000 (KR) .......................................... 2000-44917

(51) Int. Cl.[7] .............................................. G02F 1/136
(52) U.S. Cl. ........................... 349/42; 349/43; 349/139; 257/59; 257/72
(58) Field of Search ........................... 349/42, 43, 139, 349/44, 54, 192, 40; 257/59, 72

(56) References Cited

U.S. PATENT DOCUMENTS 5,528,396 A * 6/1996 Someya et al. ............... 349/43
6,091,466 A * 7/2000 Kim et al. .................... 349/43
6,452,654 B2 * 9/2002 Kubo et al. .................. 349/114

* cited by examiner

Primary Examiner—Tom Thomas
Assistant Examiner—Matthew C Landau
(74) Attorney, Agent, or Firm—Morgan Lewis & Bockius LLP

(57) ABSTRACT

A liquid crystal display device includes a substrate, a thin film transistor disposed on the substrate, the thin film transistor including a gate electrode, a source electrode and a drain electrode, a gate line arranged in a first direction on the substrate, the gate line connected with the gate electrode of the thin film transistor, a gate insulation layer disposed on the substrate and covering the gate line and the gate electrode of the thin film transistor, an intrinsic semiconductor layer disposed on the gate insulation layer, an extrinsic semiconductor layer disposed on the intrinsic semiconductor layer, a data line arranged in a second direction substantially perpendicular to the first direction disposed on the extrinsic semiconductor layer, the data line connected to the source electrode of the thin film transistor, first and second dummy metal layers formed over the gate line and arranged on opposite sides of the data line, a passivation layer covering the data line, the source electrode, the drain electrode and the first and second dummy metal layers, and a pixel electrode located at a pixel region defined by an intersection of the gate line and the data line, the pixel electrode contacting the drain electrode of the thin film transistor.

12 Claims, 8 Drawing Sheets

ARRAY SUBSTRATE FOR A LIQUID CRYSTAL DISPLAY AND METHOD FOR FABRICATING THEREOF

This application claims the benefit of Korean Patent Application No. 2000-44917, filed on Aug. 2, 2000 in Korea, which is hereby incorporated by reference in its entirety.

BACKGROUND OF THE INVENTION

1. Field of the Invention

The present invention relates to a liquid crystal display device, and more particularly, to an array substrate for a liquid crystal display device, which is fabricated by a four-mask process.

2. Description of Related Art

In general, liquid crystal display (LCD) devices make use of optical anisotropy and polarization properties of liquid crystal molecules to control arrangement orientation. The arrangement direction of the liquid crystal molecules can be controlled by an applied electric field. Accordingly, when an electric field is applied to liquid crystal molecules, the arrangement of the liquid crystal molecules changes. Since refraction of incident light is determined by the arrangement of the liquid crystal molecules, display of image data can be controlled by changing the electric field applied to the liquid crystal molecules.

Of the different types of known LCDs, active matrix LCDs (AM-LCDs), which have thin film transistors and pixel electrodes arranged in a matrix form, are the subject of significant research and development because of their high resolution and superiority in displaying moving images.

LCD devices have wide application in office automation (OA) equipment and video units because of their light, thin, low power consumption characteristics. The typical liquid crystal display (LCD) panel has an upper substrate, a lower substrate and a liquid crystal layer interposed therebetween. The upper substrate, commonly referred to as a color filter substrate, usually includes a common electrode and color filters. Common electrodes function as ground electrodes to prevent liquid crystal cells from breaking down. The lower substrate, commonly referred to as an array substrate, includes switching elements, such as thin film transistors (TFTs), and pixel electrodes.

As previously described, LCD device operation is based on the principle that the alignment direction of the liquid crystal molecules is dependent upon an electric field applied between the common electrode and the pixel electrode. Moreover, because the liquid crystal molecules have a spontaneous polarization characteristic, the liquid crystal layer is considered an optical anisotropy material. As a result of this spontaneous polarization characteristic, the liquid crystal molecules possess dipole moments when a voltage is applied to the liquid crystal layer between the common electrode and pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

The array substrate having the thin film transistors (TFTs) is commonly fabricated by depositing layers and then patterning them using multiple photolithographic processes. When patterning the layers, a five- or six-mask process is generally employed. However, a four-mask process is quite common and widely known for reducing manufacturing costs.

FIG. 1 is a plan view showing a pixel of an array substrate fabricated using a four-mask fabrication process for use in a conventional liquid crystal display device. FIG. 2 is a cross-sectional view taken along line II—II of FIG. 1 and shows a thin film transistor and a storage capacitor.

In FIG. 1, an array substrate 8 includes a region "P" having a corresponding thin film transistor (TFT) "T", a pixel electrode 81 and a corresponding storage capacitor "S." Gate lines 21 are arranged in a transverse direction and data lines 61 are arranged in a longitudinal direction such that each pair of gate lines 21 and the data lines 61 define a pixel region "P." Each TFT "T" includes a gate electrode 22, a source electrode 62, a drain electrode 63 and a channel region "C." The gate electrode 22 of each TFT "T" extends from the gate line 21, the source electrode 62 of each TFT "T" extends from the data line 61, and the drain electrode 63 is spaced apart from the source electrode 62. Each storage capacitor "S" includes a capacitor electrode 65, a portion of the pixel electrode 81 and a portion of the gate line 21.

In FIGS. 1 and 2, the gate line 21 and the gate electrode 22 are first formed on a substrate 10 by depositing and patterning a first metal layer. A gate insulation layer 30 is formed on the substrate 10 to cover the gate line 21 and the gate electrode 22. On the gate insulation layer 30, first and second intrinsic semiconductor layers 41 and 45, which are pure amorphous silicon, are respectively formed over the gate line 21 and the gate electrode 22. First, second and third extrinsic semiconductor layers 51, 52 and 55, which are doped amorphous silicon, are formed on the first and second intrinsic semiconductor layers 41 and 45. The first intrinsic semiconductor layer 41 disposed over the gate electrode 22 is called an active layer, and the first and second extrinsic semiconductor layers 51 and 52 disposed on the first intrinsic semiconductor layer 41 are called first and second ohmic contact layers, respectively, that enhance contact characteristics between the active layer 41 and the source and drain electrodes 62 and 63. The data line 61, the source electrode 62 and the drain electrode 63 are formed on the first and second extrinsic semiconductor layers 51 and 52 by depositing and patterning a second metal layer. Further, the capacitor electrode 65 is formed on the third extrinsic semiconductor layer 55 and over a portion of the gate line 21 when forming the data line 61 and the source and drain electrodes 62 and 63. Thus, the portion of the gate line 21 functions as the other capacitor electrode of the storage capacitor "S." A passivation layer 71 is formed on the source and drain electrodes 62 and 63 and the capacitor electrode 65. As shown in FIGS. 1 and 2, the passivation layer 71 is formed along the patterned second metallic material such that the passivation layer 71 covers the data line 61, the source and drain electrodes 62 and 63, and the capacitor electrode 65. Moreover, the passivation layer 71 has the same shape as the patterned second metallic material.

Furthermore, the pixel electrode 81 is formed in the pixel region "P" by depositing and patterning a transparent conductive material such as indium-tin-oxide (ITO) or indium-zinc-oxide (IZO). The pixel electrode 81 contacts side portions of the drain electrode 63 and the capacitor electrode 65. In the storage capacitor "S," the pixel electrode 81 overlaps not only a portion of the capacitor electrode 65 but also a portion of the gate electrode 21.

FIGS. 3A to 3C are cross-sectional views taken along line II—II of FIG. 1 and show conventional fabricating processes of an array substrate using a four-mask process.

Referring to FIG. 3A, a first metal layer is deposited on the substrate 10 and patterned using a first mask to form the gate line 21 along a transverse direction and a gate electrode 22 that extends from the gate line 21. A material for forming the first metal layer includes chromium (Cr), molybdenum (Mo), and aluminum (Al) or alloys thereof.

Now, referring to FIG. 3B, a gate insulation layer 30, a pure amorphous silicon layer 40 and a doped amorphous silicon layer 50 are sequentially formed on the substrate 10 to cover the patterned metal layer. Thereafter, the second metal layer 60 is deposited on the doped amorphous silicon layer 50 using a sputtering method. Then, the second metal layer 60 is patterned to form a channel region "C" over the gate electrode 22. Namely, portions of both the second metal layer 60 and the doped amorphous silicon layer 50 over the gate electrode 22 are etched using a second mask to form the channel region "C" in the pure amorphous silicon layer 40.

Referring to FIG. 3C, an inorganic material, such as silicon nitride ($SiN_x$) or silicon oxide ($SiO_x$), is deposited on the patterned second metal layer 60 (in FIG. 3B). Thereafter, the inorganic material, the second metallic material 60, the doped amorphous silicon layer 50 and the pure amorphous silicon layer 40 are simultaneously patterned using a third mask, thereby forming the passivation layer 71, the data line 61, the source electrode 62, the drain electrode 63, the capacitor electrode 65, the first, second and third extrinsic semiconductor layers 51, 52 and 55, and the first and second intrinsic semiconductor layers 41 and 45.

Thereafter, referring back to FIG. 2, a transparent conductive material is deposited over an entire surface of the substrate 10 and patterned using a fourth mask. Therefore, as described above, the pixel electrode 81 is formed in the pixel region "P" (in FIG. 1). Further, one portion of the pixel electrode 81 contacts the side portion of the drain electrode 63 and overlaps a portion of the drain electrode 63, while another portion of the pixel electrode 81 contacts a side portion of the capacitor electrode 65 and overlaps a portion of the capacitor electrode 65.

As previously described, since the array substrate is fabricated by the four-mask process, the manufacturing costs decrease. However, some significant problems occur as a result of the aforementioned fabrication process.

FIG. 4A is an enlarged view of a portion "A" of FIG. 1, and FIG. 4B is an enlarged cross-sectional view taken along line IV—IV of FIG. 4A.

As described before, the inorganic material, the second metal layer, the doped amorphous silicon layer and the pure amorphous silicon layer are simultaneously etched during the third mask process. Therefore, only the gate insulation layer 30 remains in the pixel region "P". Further, as shown in FIG. 4B, a portion "B" of the gate insulation layer 30 located on the step portion of the gate line 21 may be removed after the third mask process. While patterning the transparent conductive material during the fourth mask process, the portion "B" of the gate insulation layer 30 may suffer insulator breakdown. During insulator breakdown, the gate line 21 and the date line 61 are electrically short-circuited at the crossover point of the gate line 21 and the data line 61. As a result, manufacturing defects can occur in the array substrate, thereby decreasing manufacturing yields of the LCD device.

SUMMARY OF THE INVENTION

Accordingly, the present invention is directed to an array substrate for a liquid crystal display and method for fabricating thereof that substantially obviates one or more of problems due to limitations and disadvantages of the related art.

An object of the present invention is to provide an array substrate for a liquid crystal display device which has a structure preventing short-circuit connection between a gate line and a data line.

Another object of the present invention is to provide a method of fabricating an array substrate for a liquid crystal display device with decreased defects to increase manufacturing yields.

Additional features and advantages of the invention will be set forth in the description that follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a substrate, a thin film transistor disposed on the substrate, the thin film transistor including a gate electrode, a source electrode and a drain electrode, a gate line arranged in a first direction on the substrate, the gate line connected with the gate electrode of the thin film transistor, a gate insulation layer disposed on the substrate and covering the gate line and the gate electrode of the thin film transistor, an intrinsic semiconductor layer disposed on the gate insulation layer, an extrinsic semiconductor layer disposed on the intrinsic semiconductor layer, a data line arranged in a second direction substantially perpendicular to the first direction disposed on the extrinsic semiconductor layer, the data line connected to the source electrode of the thin film transistor, first and second dummy metal layers formed over the gate line and arranged on opposite sides of the data line, a passivation layer covering the data line, the source electrode, the drain electrode and the first and second dummy metal layers, and a pixel electrode located at a pixel region defined by an intersection of the gate line and the data line, the pixel electrode contacting the drain electrode of the thin film transistor.

In another aspect, a method of fabricating a liquid crystal display device includes the steps of forming a first metal layer on a substrate, forming a gate line and a gate electrode from the first metal layer, forming a gate insulation layer, a pure amorphous silicon layer, a doped amorphous silicon layer and a second metal layer to cover the patterned first metal layer, forming a data line, a source electrode, a drain electrode, a first dummy metal layer, a second dummy metal layer and a capacitor electrode from the second metal layer, the first and second dummy metal layers arranged on opposite sides of the data line and over the gate line, forming an insulator to cover the patterned second metal layer, forming a passivation layer and a pure amorphous silicon layer to cover the data line, the source electrode, the drain electrode, the first dummy metal layer, the second dummy metal layer and the capacitor electrode, and forming a pixel electrode located at a pixel region defined by an intersection of the gate line and the data line, the pixel electrode contacting the drain electrode and the capacitor electrode.

In another aspect, a liquid crystal display device includes a substrate, a gate line disposed on the substrate along a first direction, the gate line connected with a gate electrode of a thin film transistor, a data line disposed on the substrate along a second direction substantially perpendicular to the first direction, the data line connected to a source electrode of the thin film transistor, and first and second dummy metal layers disposed over the gate line and on opposite sides of the data line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF ILLUSTRATED EMBODIMENTS

Reference will now be made in detail to illustrated embodiment of the present invention, examples of which are shown in the accompanying drawings. Wherever possible, the same reference numbers will be used throughout the drawings to refer to the same or like parts.

Figure 5:
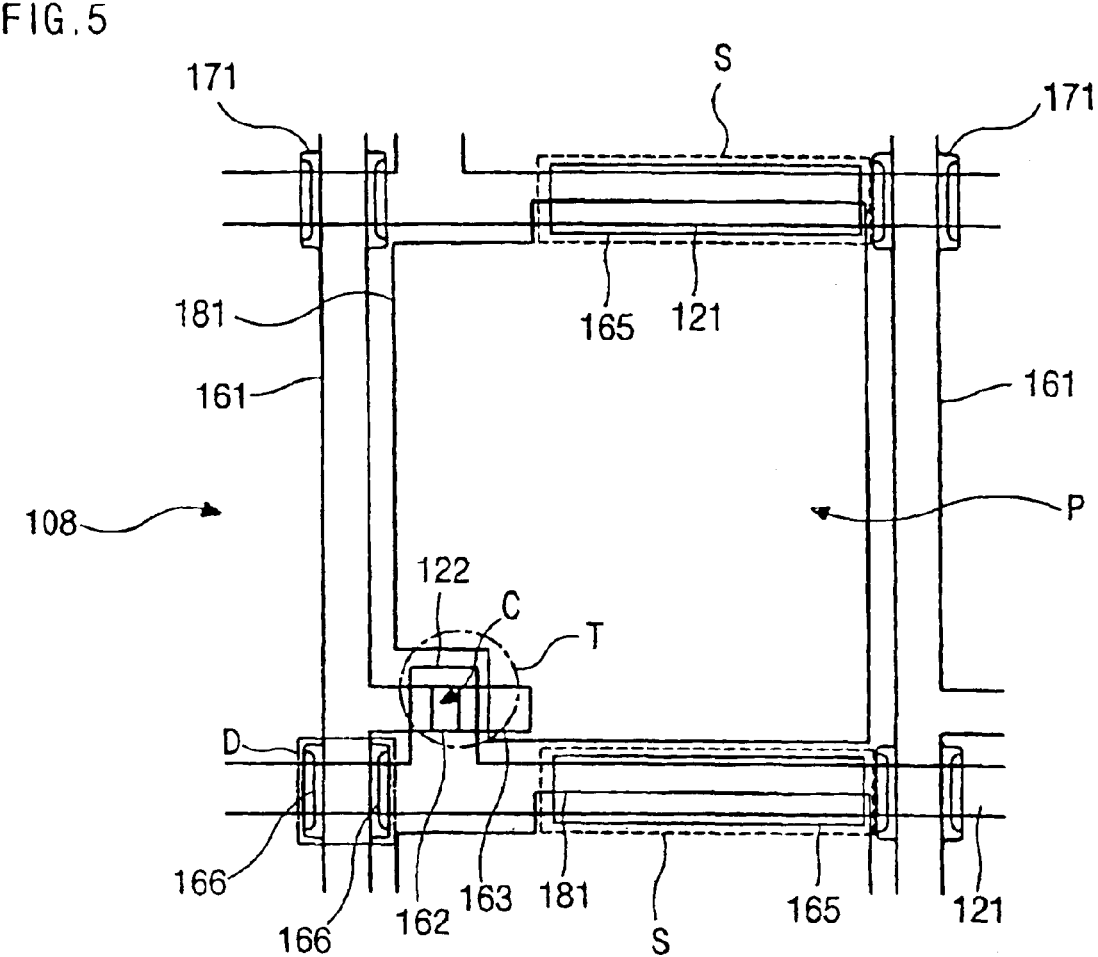
FIG. 5 is a plan view showing a pixel of an exemplary array substrate fabricated using a four-mask fabrication process for use in a liquid crystal display device according to the present invention.

FIG. 5 is a plan view showing a pixel of an exemplary array substrate fabricated using a four-mask fabrication process for use in a liquid crystal display device according to an embodiment of the present invention.

In FIG. 5, an array substrate 108 includes a region "P" having a corresponding thin film transistor (TFT) "T", a pixel electrode 181 and a corresponding storage capacitor "S." Gate lines 121 are arranged in a substantially transverse direction and data lines 161 are arranged in a substantially longitudinal direction such that each pair of gate lines 121 and the data lines 161 define a pixel region "P." Each TFT "T" includes a gate electrode 122, a source electrode 162, a drain electrode 163 and a channel region "C." The gate electrode 122 of each TFT "T" extends from the gate line 121, while the source electrode 162 of each TFT "T" extends from the data line 161. The drain electrode 163 is spaced apart from the source electrode 162. Each storage capacitor "S" includes a capacitor electrode 165, a portion of the pixel electrode 181 and a portion of the gate line 121.

In FIG. 5, the array substrate of the present invention includes dummy metal layers 166 near the crossover point of the gate line 121 and the data line 161. The dummy metal layers 166 may be formed over the gate line 121 and in a same plane as the data line 161 and the capacitor electrode 165. Further, as shown in FIG. 5, two dummy metal layers 166 are positioned in both sides of the data line 161 near the crossover point of the gate line 121 and the data line 161.

Figure 6:
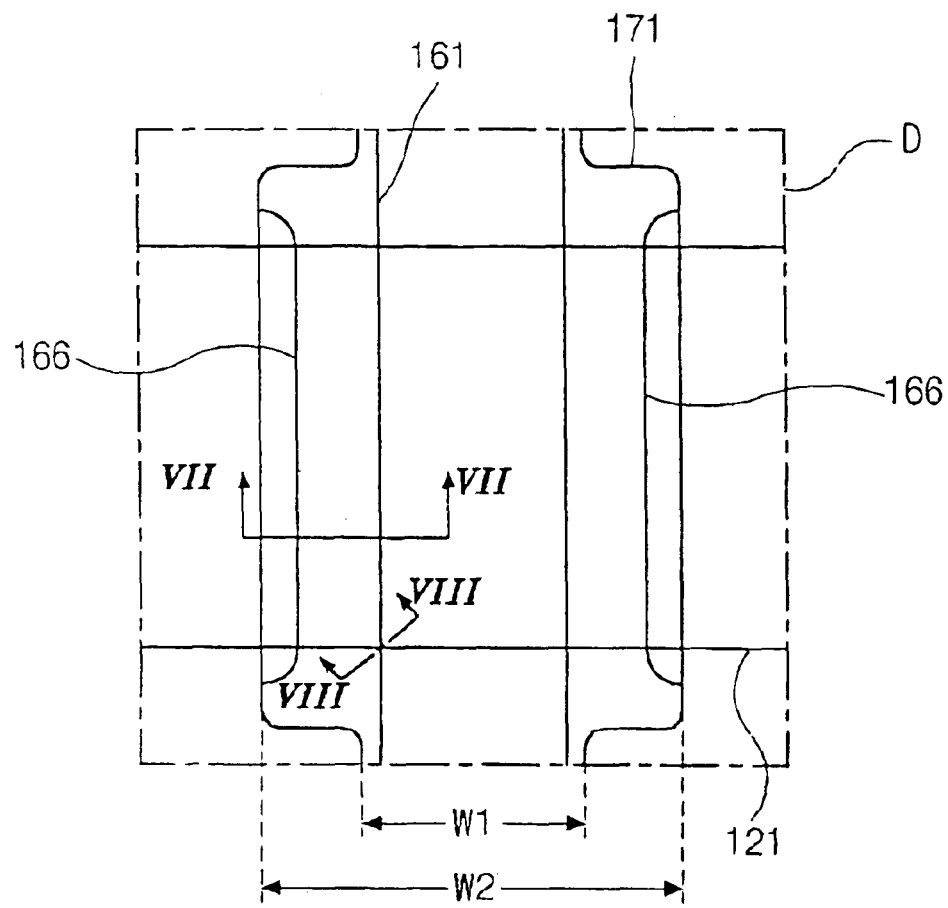
FIG. 6 is an enlarged plan view of a portion "D" of FIG. 5.
Figure 7:
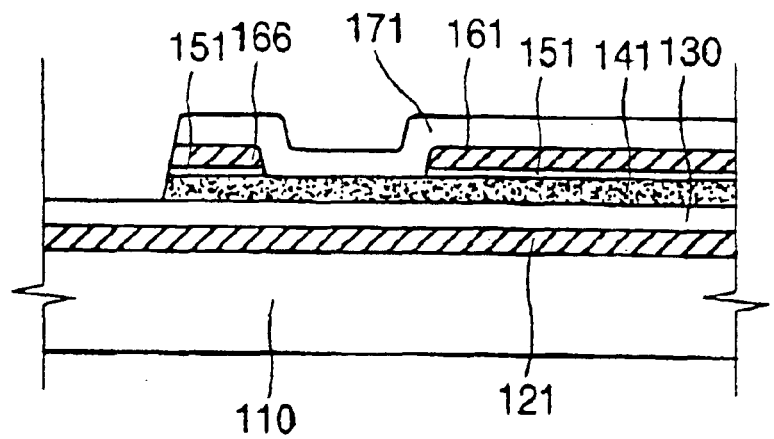
FIG. 7 is a cross-sectional view taken along line VII—VII of FIG. 6.
Figure 8:
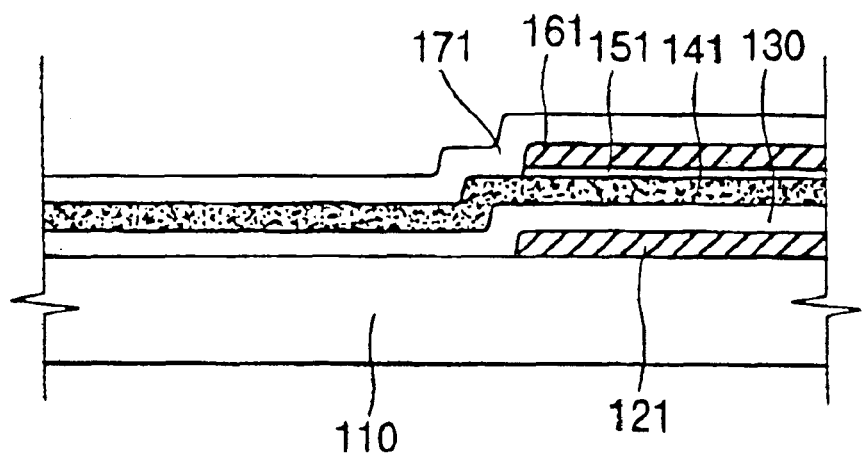
FIG. 8 is a cross-sectional view taken along line VIII—VIII of FIG. 6.

FIG. 6 is an enlarged plan view of a portion "D" of FIG. 5, FIG. 7 is a cross-sectional view taken along line VII—VII of FIG. 6, and FIG. 8 is a cross-sectional view taken along line VIII—VIII of FIG. 6.

FIGS. 6 to 8, the gate line 121 is formed on a substrate 110, and the gate insulation layer 130 is formed on the substrate 110 and covers the gate line 121. An intrinsic semiconductor layer 141 may be formed on the gate insulation layer 130, and an extrinsic semiconductor layer 151 may be formed on the intrinsic semiconductor layer 141. The intrinsic semiconductor layer 141 may be fanned of pure amorphous silicon and the extrinsic semiconductor layer 151 may be formed of doped amorphous silicon. The data line 161 that is perpendicular to the gate line 121 may be formed on the extrinsic semiconductor layer 151, and the dummy metal layers 166 may be formed on both sides of the data line 161 and located above the gate line 121. A passivation layer 171 may be formed on the data line 161 and on the dummy metal layers 166 and may have the same shape as the data line 161 except for a portion at a crossover point of the gate line 121 and data line 161. The passivation layer 171 has a first width W1 disposed along directions of the data and gate lines 121 and 161 and a second width W2 larger than the first width W1 at the crossover point to cover not only the data line 161 but also the dummy metal layers 166.

Furthermore, due to the aforementioned fourth mask process, the intrinsic semiconductor layer 141 has the same shape as the passivation layer 171. In contrast to conventional structures, the gate insulation layer 130, as shown in FIG. 8, is not exposed at the crossover point of the gate line 121 and the data line 161. Additionally, since both the gate insulation layer 130 and the intrinsic semiconductor layer 141 cover the gate line 121, any electrical short connection between the gate line 121 and the data line 161 may be prevented at the crossover point of the gate line 121 and the data line 161.

Figure 9A:
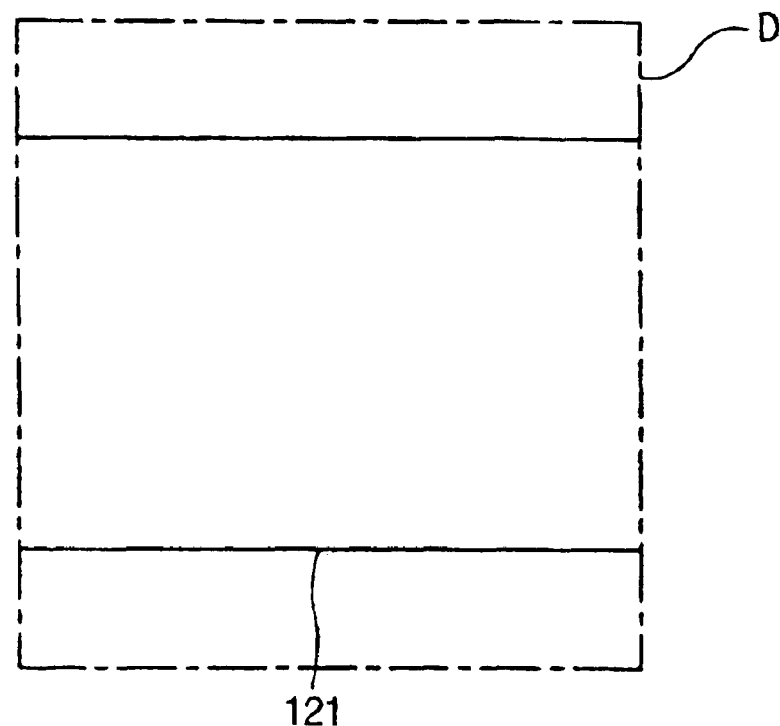
FIGS. 9A and 9B are enlarged plan views of a portion "D" of FIG. 5 and show an exemplary fabrication processes of an array substrate according to the present invention.
Figure 9B:
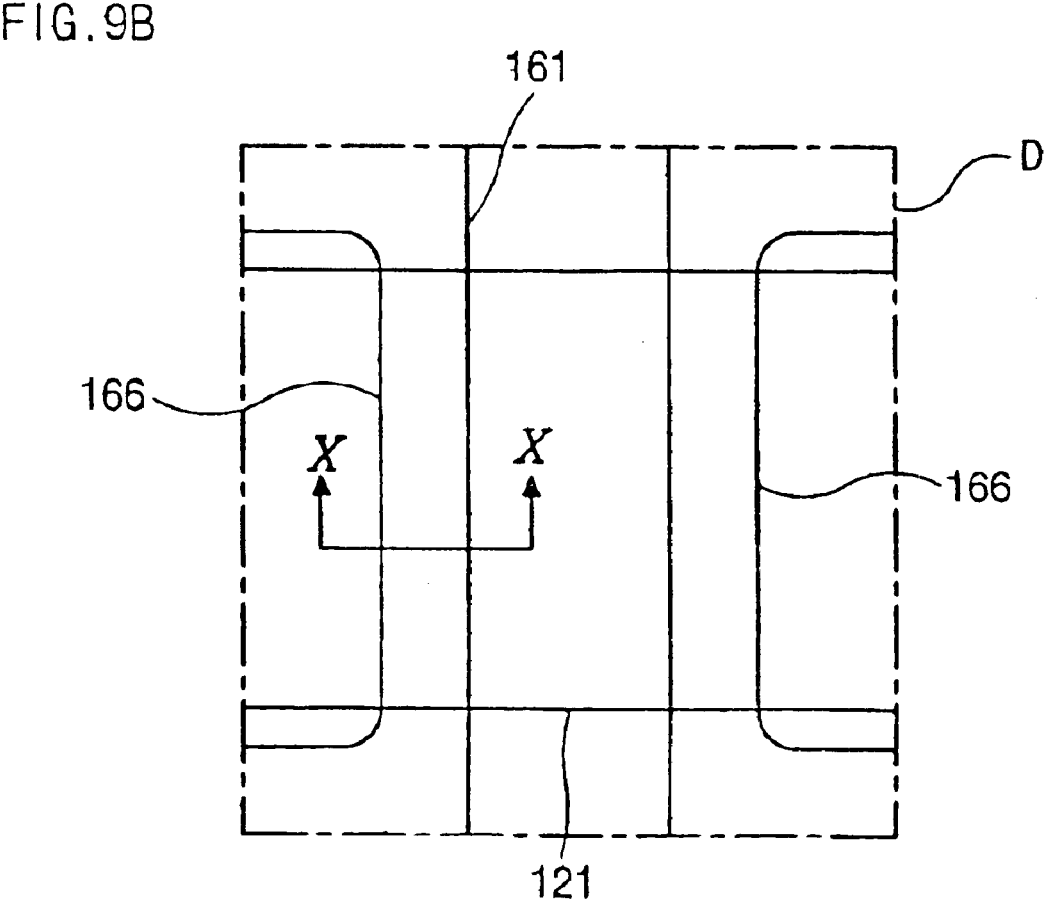
Figure 10A:
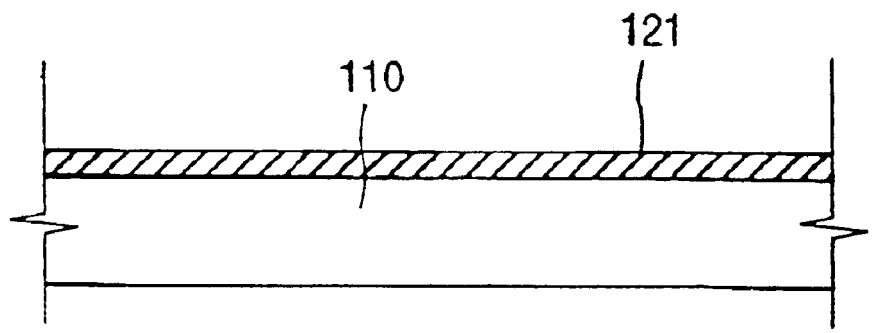
FIG. 10A is a sectional view of FIG. 9A.

FIGS. 9A and 9B are enlarged plan views of a portion "D" of FIG. 5 and show an exemplary fabrication processes of an array substrate according to the present invention. FIG. 10A is a sectional view of FIG. 9A, and FIG. 10B is a cross-sectional view taken along line X—X of FIG. 9B.

In FIGS. 9A and 10A, a first metal layer may be deposited on a substrate 110 by a sputtering process, for example, and patterned using a first mask to form a gate line 121 in a transverse direction and a gate electrode 122 (in FIG. 5) that extends from the gate line 121.

Figure 10B:
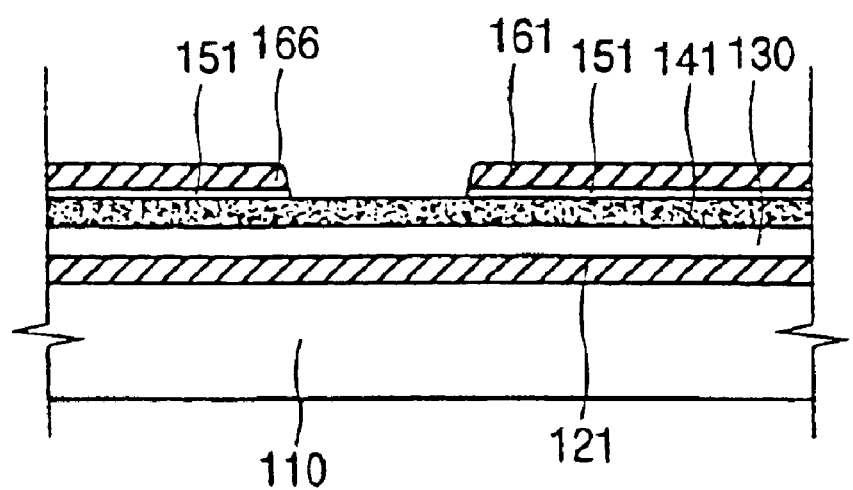
FIG. 10B is a cross-sectional view taken along line X—X of FIG. 9B.

In FIGS. 9B and 10B, a gate insulation layer 130 is formed upon an entire surface of the substrate 110 and covers the patterned first metal layer. An intrinsic semiconductor layer 141 and an extrinsic semiconductor layer 151 may be sequentially formed on the gate insulation layer 130, and a second metal layer may be formed on the extrinsic semiconductor layer 151. The second metal layer may be a same metal as the first metal layer. Then, the second metal layer is patterned using a second mask, thereby forming the data line 161, the dummy metal layers 166, the capacitor electrode 165, the source electrode 162, and the drain electrode 163. Moreover, the extrinsic semiconductor layer 151 may be etched using the patterned second metal layer as masks. However, the data line 161, the dummy metal layers 166, the capacitor electrode 165, the source electrode 162, and the drain electrode 163 may be formed during a third mask process. Namely, the second metal layer may be patterned into designed shapes using a third mask.

In FIGS. 6 and 7, an insulator that includes an inorganic material, such as silicon nitride ($SiN_x$) or silicon oxide ($SiO_x$), or an organic material, such as benzocyclobutene (BCB) or acryl, may be formed over an entire surface of the substrate 110, and patterned to form the passivation layer 171 using a third mask. During the third mask process, the intrinsic semiconductor layer 141 may also be patterned such that only gate insulation layer 130 remains in the pixel region "P" (in FIG. 5). However, the passivation layer 171 and the intrinsic semiconductor layer 141 remain over the gate line 121 at the crossover point of the gate line 121 and the data line 161. The passivation layer 171 may have a same shape as the data line 161 and covers the data line 161. At the crossover point of the gate line 121 and the data line 161, the passivation layer 171 may also cover the dummy metal layers 166. During the third mask process, a portion of the dummy metal layer 166, which is not covered by the passivation layer, may also be etched.

Figure 1:
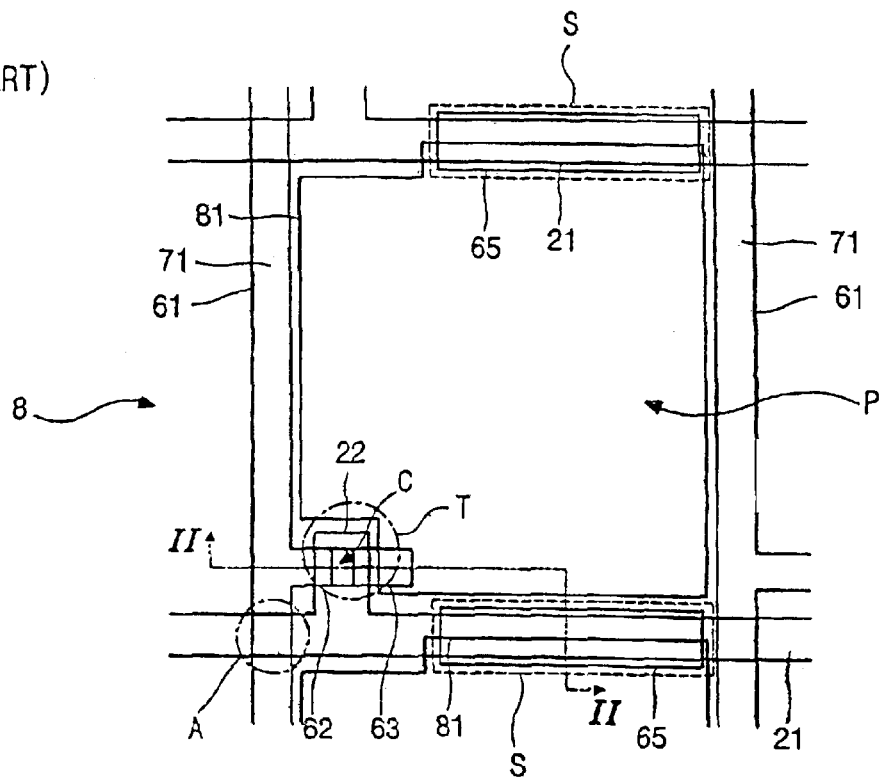
FIG. 1 is a plan view showing a pixel of an array substrate fabricated using a four-mask fabrication process for use in a conventional liquid crystal display device.
Figure 2:
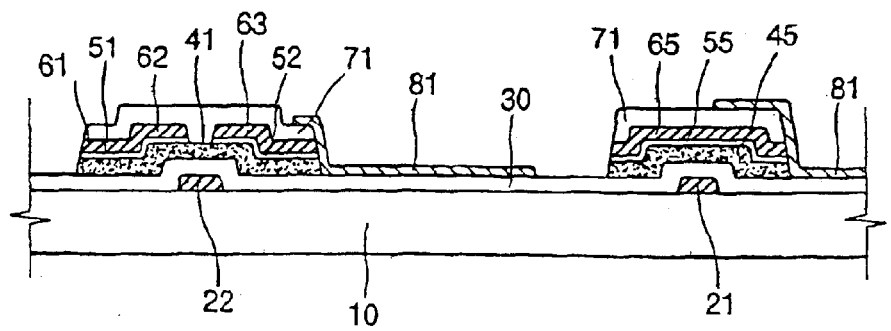
FIG. 2 is a cross-sectional view taken along line II—II of FIG. 1 and shows a thin film transistor and a storage capacitor.
Figure 3A:
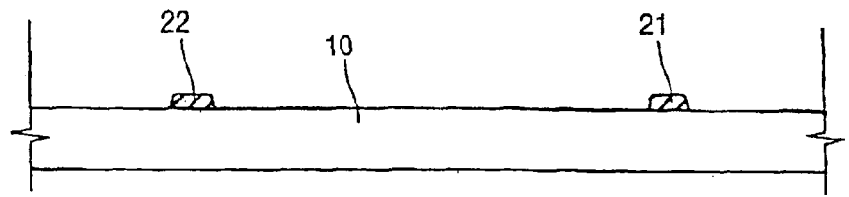
FIGS. 3A to 3C are cross-sectional views taken along line II—II of FIG. 1 and show conventional fabricating processes of an array substrate using a four-mask process.
Figure 3B:
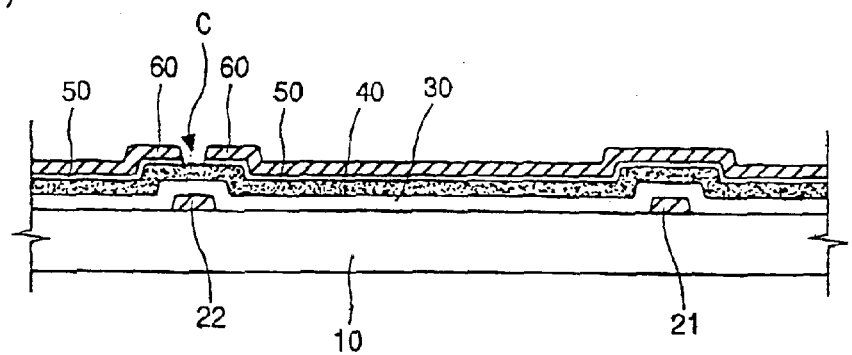
Figure 3C:
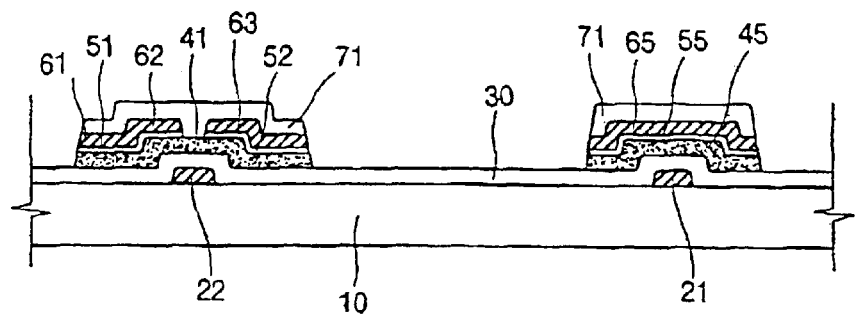
Figure 4A:
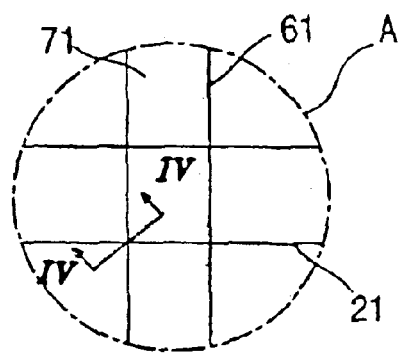
FIG. 4A is an enlarged plan view of a portion "A" of FIG. 1.
Figure 4B:
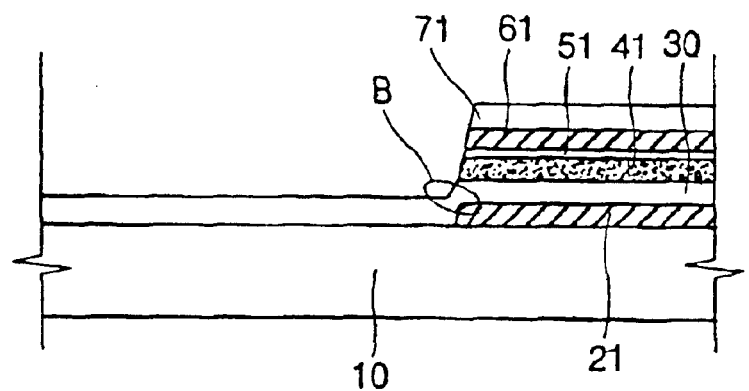
FIG. 4B is an enlarged cross-sectional view taken along line IV—IV of FIG. 4A.

In FIG. 5, a transparent conductive material including at least indium-tin-oxide (ITO) or indium-zinc-oxide (IZO) may be deposited and patterned to form pixel electrode 181 using a fourth mask. Accordingly, the pixel electrode 181 is positioned in the pixel region "P." A first portion of the pixel electrode 181 contacts a side portion of the drain electrode 163, and a second portion of the pixel electrode 181 extends over a portion of the gate line 121, thereby becoming a part of the storage capacitor "S" by way of contacting the side portion of the capacitor electrode 165, as shown in FIG. 2.

As previously described, the dummy metal layers 166 are formed over the gate line 121 at both side of the data line 161 at the crossover point of the gate line 121 and the data line 161, and the passivation layer 171 covers the data line 161 and the dummy metal layers 166. Accordingly, the gate insulation layer 130 may not be exposed at the crossover point of the gate line 121 and the data line 161. Furthermore, since both the gate insulation layer 130 and the intrinsic semiconductor layer 141 cover the gate line 121 at the crossover point, an electrical short between the gate line 121 and the date line 161 may not occur at the crossover point. Although an electrical short connection may occur between the dummy metal layers 166 and the gate line 121, the electrical short connection may not affect the data line 161 because the dummy metal layers 166 are electrically isolated from the data line 166.

It will be apparent to those skilled in the art that various modifications and variations can be made in the liquid crystal display device and manufacturing method thereof of the present invention without departing from the spirit or scope of the inventions. Thus, it is intended that the present invention cover the modifications and variations of this invention provided they come within the scope of the appended claims and their equivalents.

What is claimed is:

1. A liquid crystal display device, comprising:
   a substrate;
   a thin film transistor disposed on the substrate, the thin film transistor including a gate electrode, a source electrode and a drain electrode;
   a gate line arranged in a first direction on the substrate, the gate line connected with the gate electrode of the thin film transistor;
   a gate insulation layer disposed on the substrate and covering the gate line and the gate electrode of the thin film transistor;
   an intrinsic semiconductor layer disposed on the gate insulation layer;
   an extrinsic semiconductor layer disposed on the intrinsic semiconductor layer;
   a data line arranged in a second direction substantially perpendicular to the first direction disposed on the extrinsic semiconductor layer, the data line connected to the source electrode of the thin film transistor;
   first and second dummy metal layers formed contacting the extrinsic semiconductor layer over the gate line and arranged on opposite sides of the data line, the first and second dummy metal layers electrically floating;
   a passivation layer covering the data line, the source electrode, the drain electrode and the first and second dummy metal layers; and
   a pixel electrode contacting the drain electrode of the thin film transistor.

2. The liquid crystal display device according to claim 1, wherein the first and second dummy metal layers are formed of a same material as the data line.

3. The liquid crystal display device according to claim 1, wherein the first and second dummy metal layers are electrically isolated from the data line.

4. The liquid crystal display device according to claim 1, wherein the pixel electrode is formed of at least one of indium-tin-oxide (ITO) and indium-zinc-oxide (IZO).

5. The liquid crystal display device according to claim 1, further comprising a storage capacitor that includes a capacitor electrode, a portion of the gate line and a portion of the pixel electrode.

6. The liquid crystal display device according to claim 5, wherein the portion of the pixel electrode contacts the capacitor electrode.

7. The liquid crystal display device according to claim 1, wherein the intrinsic semiconductor layer extends along the gate insulation layer to cover the gate line at the intersection of the gate line and the data line.

8. The liquid crystal display device according to claim 1, wherein the passivation layer has a first width disposed along the first and second directions and a second width covering the intersection of the gate line and the data line.

9. The liquid crystal display device according to claim 8, wherein the second width is greater than the first width.

10. The liquid crystal display device according to claim 1, wherein the passivation layer contacts the intrinsic semiconductor layer between at least one of the first and second dummy metal layers and the intersection of the gate line and the data line.

11. A liquid crystal display device, comprising:
    a substrate;
    a gate line disposed on the substrate along a first direction, the gate line connected with a gate electrode of a thin film transistor;
    a data line disposed on the substrate along a second direction substantially perpendicular to the first direction, the data line connected to a source electrode of the thin film transistor; and
    first and second dummy metal layers contacting a semiconductor layer over the gate line and on opposite sides of the data line,
    wherein the first and second dummy metal layers electrically float.

12. The liquid crystal display device according to claim 11, further comprising a storage capacitor that includes a capacitor electrode, a portion of the gate line and a portion of a pixel electrode, the pixel electrode contacting a drain electrode of the thin film transistor.

* * * * *